United States Patent
Rizq

(10) Patent No.: US 11,998,959 B2
(45) Date of Patent: Jun. 4, 2024

(54) HYDRATE MITIGATION IN A PIPELINE WITH VORTEX TUBES

(71) Applicant: Saudi Arabian Oil Company, Dhahran (SA)

(72) Inventor: Ahmad Noor Al-Deen Hassan Rizq, Doha (SA)

(73) Assignee: Saudi Arabian Oil Company, Dhahran (SA)

( * ) Notice: Subject to any disclaimer, the term of this patent is extended or adjusted under 35 U.S.C. 154(b) by 544 days.

(21) Appl. No.: 17/164,131

(22) Filed: Feb. 1, 2021

(65) Prior Publication Data

US 2022/0241825 A1 Aug. 4, 2022

(51) Int. Cl.
*F16L 58/00* (2006.01)
*B08B 9/032* (2006.01)
*F17C 5/06* (2006.01)

(52) U.S. Cl.
CPC .............. *B08B 9/032* (2013.01); *F16L 58/00* (2013.01); *F17C 5/06* (2013.01); *F17C 2221/033* (2013.01); *F17C 2223/0161* (2013.01); *F17C 2227/0325* (2013.01); *F17C 2265/015* (2013.01)

(58) Field of Classification Search
CPC .................. F17C 5/06; F17C 2221/033; F17C 2223/0161; F17C 2227/0325; F17C 2265/015; F16L 58/00; B08B 9/032
See application file for complete search history.

(56) References Cited

U.S. PATENT DOCUMENTS

| 2,213,039 | A | | 8/1940 | David | |
| 3,296,807 | A | | 1/1967 | Fekete | |
| 5,937,894 | A | * | 8/1999 | Rojey | ........................ F17D 3/14 |
| | | | | | 137/485 |
| 9,074,125 | B1 | | 7/2015 | Lahalih | |
| 9,689,608 | B2 | | 6/2017 | Beeler | |
| 10,704,739 | B2 | * | 7/2020 | Guo | .......................... F17D 1/02 |

(Continued)

FOREIGN PATENT DOCUMENTS

| CA | 2915490 | | 12/2014 |
| CN | 203240279 | U * | 10/2013 |
| CN | 104165269 | A * | 11/2014 |

(Continued)

OTHER PUBLICATIONS

SAIP Examination Report in Saudi Arabian Appln. No. 122430618, dated Jun. 13, 2023, 12 pages.

(Continued)

*Primary Examiner* — Devon Russell
(74) *Attorney, Agent, or Firm* — Fish & Richardson P.C.

(57) ABSTRACT

A system to prevent the formation of hydrates in a pipeline includes a heater assembly. The heater assembly has a vortex tube mounted on an outer surface of a first section of the pipeline and a compressed gas source. The vortex tube is configured to separate gas from an inlet into a hot gas pathway and a cold gas pathway. The vortex tube includes an inlet, a cold gas outlet, and a hot gas outlet. The hot gas outlet of the vortex tube is fluidly connected to an opening defined in the first section of the pipeline. The hot gas outlet is configured to flow hot gas from the vortex tube into an interior volume of the pipeline. The compressed gas source is fluidly connected to the inlet of the vortex tube.

25 Claims, 3 Drawing Sheets

(56) References Cited

U.S. PATENT DOCUMENTS

2014/0373951 A1\* 12/2014 Griffin, Jr. ......... G05D 16/0655
137/808

FOREIGN PATENT DOCUMENTS

| CN | 207922607 U | \* | 9/2018 |
| CN | 111692449 A | \* | 9/2020 |
| CN | 111963125 A | \* | 11/2020 |
| CN | 214250183 U | \* | 9/2021 |
| RU | 2151947 | | 6/2000 |
| RU | 2151947 C1 | \* | 6/2000 |
| WO | WO 2014210104 | | 12/2014 |

OTHER PUBLICATIONS

Savchenko et al., "Using Vortex Tube for Decreasing Losses of Natural Gas in Engineering Systems of Gas Supply," An International Journal for Engineering and Information Sciences, May 4, 2018, 10 pages.

Liang et al., "Experimental Investigation on Gas Hydrate Recovery using Temperature Separation Mechanism of Vortex Tube," Energy, 2020, 212:118749, 14 pages.

Noui-Mehidi et al., "Downhole Energy Harvesting from an Isothermal Well Zone by Converting a Differential Pressure into a Differential Temperature and Combining Thermo-Generators for Smart Well Completions," SPE-198145-MS, Society of Petroleum Engineers (SPE), presented at the SPE Kuwait Oil and Gas Conference and Show, Mishref, Kuwait, Oct. 13-16, 2019, 8 pages.

Tunkel and Gale, "Efficiency improvements in liquefaction using vortex feed gas precooling," Gas Processing & LNG, retrieved from URL <http://gasprocessingnews.com/features/201906/efficiency-improvements-in-liquefaction-using-vortex-feed-gas-precooling.aspx>, available on or before 2021, retrieved Feb. 3, 2021, 4 pages.

\* cited by examiner

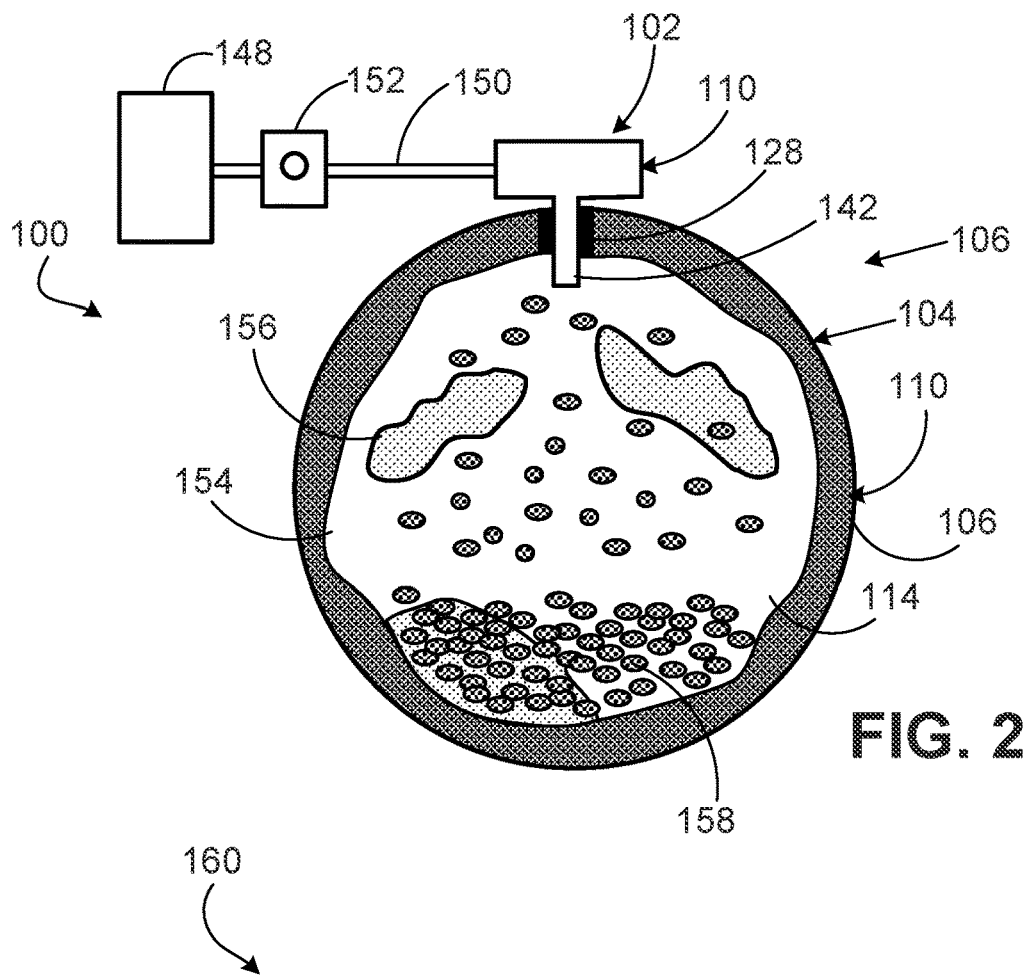

FIG. 2

Receiving first temperature signals from a temperature sensor arranged in a pipeline

↓

Determining, based on the temperature signals, that the natural gas fluid has a first temperature below 10°C

↓

In response to determining that the natural gas fluid has first temperature between below 10°C, controlling a flow of hot gas from a heater assembly mounted to the pipeline to an interior volume of the pipeline

FIG. 3

HYDRATE MITIGATION IN A PIPELINE WITH VORTEX TUBES

TECHNICAL FIELD

This disclosure relates to a pipeline, for example, a pipeline through which fluids such as hydrocarbons are flowed.

BACKGROUND

Gas hydrates are physical compounds, in which the molecules of gas are included in crystalline cells. All gases can form hydrates under different pressures and temperatures. The crystalline structure of solid gas hydrate crystals depends on the gas composition, pressure, and temperature. Formation of a gas hydrate occurs when water and natural gas are present at a low temperature and a high pressure. Such conditions can occur in oil and gas wells, and pipeline equipment.

SUMMARY

This disclosure describes technologies relating to hydrate mitigation in pipelines with vortex tubes.

In certain aspects, a system to prevent the formation of hydrates in a pipeline includes a heater assembly. The heater assembly includes a vortex tube mounted on an outer surface of a first section of the pipeline and a compressed gas source. The vortex tube is configured to separate gas from an inlet into a hot gas pathway and a cold gas pathway. The vortex tube includes an inlet, a cold gas outlet, and a hot gas outlet. The hot gas outlet of the vortex tube is fluidly connected to an opening defined in the first section of the pipeline. The hot gas outlet is configured to flow hot gas from the vortex tube into an interior volume of the pipeline. The compressed gas source is fluidly connected to the inlet of the vortex tube.

In some cases, the heater assembly has a compressed fluid line that connects the compressed gas source to the inlet of the vortex tube. A valve can be mounted on the compressed fluid line. The valve can be configured to control a volume of compressed fluid that enters the vortex tube.

Some systems further include one or more processors; and a computer-readable medium storing instructions executable by the one or more processors to perform operations. The operations include receiving signals from a temperature sensor arranged in the pipeline downstream of the opening of the pipeline; and controlling the valve mounted on the compressed fluid line to increase or decrease an amount of hot air entering the pipeline from the vortex tube.

In some cases, the heater assembly includes a fluid tubing connects the hot gas outlet of the vortex tube to the opening of the pipeline. Some heater assemblies includes a valve mounted on the fluid tubing. The valve is configured to control a volume of hot gas that enters the pipeline by the opening.

Some systems further include one or more processors; and a computer-readable medium storing instructions executable by the one or more processors to perform operations. The operations include receiving signals from a temperature sensor arranged in the pipeline downstream of the opening of the pipeline; and controlling the valve mounted on the fluid tubing to increase or decrease an amount of hot air entering the pipeline from the vortex tube.

In some embodiments, the cold gas outlet vents cold gas to the environment.

In some cases, the hot gas pathway of the vortex tube extends from the inlet of the vortex tube to the hot gas outlet of the vortex tube.

Some cold gas pathways of the vortex tube extend from the inlet of the vortex tube to the cold gas outlet of the vortex tube.

In some embodiments, the system further includes, at least one temperature sensor arranged in the interior volume of the first section of the pipeline.

Some system further include at least one pressure sensor arranged in the interior volume of the first section of the pipeline.

In certain aspects, a system to prevent the formation of hydrates in a pipeline is disclosed. The system includes a first heater assembly and a second heater assembly. The first heater assembly includes a first vortex tube mounted on a first section of the pipeline. The first vortex tube has a first inlet, a first cold gas outlet, and a first hot gas outlet. The first hot gas outlet of the first vortex tube is fluidly connected to a first opening of the first section of the pipeline. The second heater assembly includes a second vortex tube mounted on a second section of the pipeline in fluid commination with the first section. The second vortex tube has a second inlet, a second cold gas outlet, and a second hot gas outlet. The second hot gas outlet of the second vortex tube is fluidly connected to a second opening of the second section of the pipeline.

Some systems further include a first compressed gas source fluidly connected to the inlet of the first vortex tube. The first compressed gas source can be fluidly connected to the inlet of the second vortex tube. In some embodiments, the system further includes a second compressed gas source fluidly connected to the inlet of the second vortex tube.

In some cases, the system further includes at least one temperature sensor arranged in an interior volume of the first section or the second section of the pipeline. The at least one temperature sensor can be mounted on an inner surface of the first section of the pipeline, the inner surface of the second section of the pipeline, or both the inner surface of the first section and an inner surface of the second section.

Some system further include a third heater assembly having a third vortex tube mounted on an outer surface of a third section of the pipeline In certain aspects, a method to prevent formation of hydrates in a pipeline is disclosed. The method includes receiving first temperature signals from a temperature sensor arranged in a pipeline, wherein the temperature signals indicate a temperature of a natural gas fluid flowing through the pipeline, determining, based on the temperature signals, that the natural gas fluid has a first temperature below 10° C., and in response to determining that the natural gas fluid has a first temperature between below 10° C., controlling a flow of hot gas from a heater assembly mounted to the pipeline to an interior volume of the pipeline. The flow of the hot gas prevents the formation of hydrates in the pipeline.

In some methods, controlling a flow of hot gas from a heater assembly to an interior volume of the pipeline includes controlling a valve arranged in a fluid line of a heater assembly such that a hot gas from an outlet of a vortex tube flows into the pipeline via an opening in the pipeline. In some embodiments, the fluid line is a compressed fluid line connecting a compressed fluid source of the heater assembly to a vortex tube of the heater assembly. In some cases, the fluid line is a fluid tubing connecting an outlet of a vortex tube of the heater assembly to an opening in the pipeline.

In some methods, controlling a flow of hot gas from a heater assembly to an interior volume of the pipeline includes controlling a pump rate of a pump arranged on a compressed fluid line of a heater assembly.

Some methods further include receiving pressure signals from a pressure sensor arranged in the pipeline, and determining the pressure of the pipeline based on the pressure sensor.

In some cases, the method further includes receiving second temperature signals from the temperature sensor, determining, based on the second temperature signals, that the natural gas fluid has a second temperature above 25° C., and controlling a valve such that valve closes or partially closes.

The details of one or more embodiments of the disclosure are set forth in the accompanying drawings and the description below. Other features, objects, and advantages will be apparent from the description and drawings, and from the claims.

DESCRIPTION OF DRAWINGS

FIG. 2 is a cross sectional view of the section of the pipeline shown in FIG. 1 with the heater assembly.

FIG. 3 is a flow chart of a method to prevent the formation of hydrates using a system having a heater assembly.

Like reference symbols in the various drawings indicate like elements.

DETAILED DESCRIPTION

A system is disclosed for eliminating hydrates or preventing the formation of hydrates in a natural gas fluid flowing in a pipeline. Natural gas is generated and transported during gas production operations. Hydrates form by combining natural gas and water under specific combinations of pressure and temperatures that may be present when transporting the natural gas in a pipeline, for example, during winter operations. The disclosed system includes a natural gas pipeline with an opening in the wall of the pipeline. A vortex tube is mounted on the pipeline and has a hot gas outlet fluidly connected to the opening of the pipeline, and a compressed gas source connected to an inlet of the vortex tube. The vortex tube separates the compressed gas entering the inlet into a cold gas flow, vented to the environment, and a hot gas flow, connected to the opening of the pipeline. The hot compressed gas mixes with the natural gas fluid flowing in the pipeline to raise the temperature of the natural gas fluid. The temperature of the natural gas fluid is raised to such a degree that new hydrates cannot form and formed hydrates are dissolved. The system and methods for eliminating and preventing hydrates from a natural gas pipeline may prevent or reduce the occurrence of hydrate plugs or blockages, thereby reducing gas production stoppages or interruptions.

Figure 1:
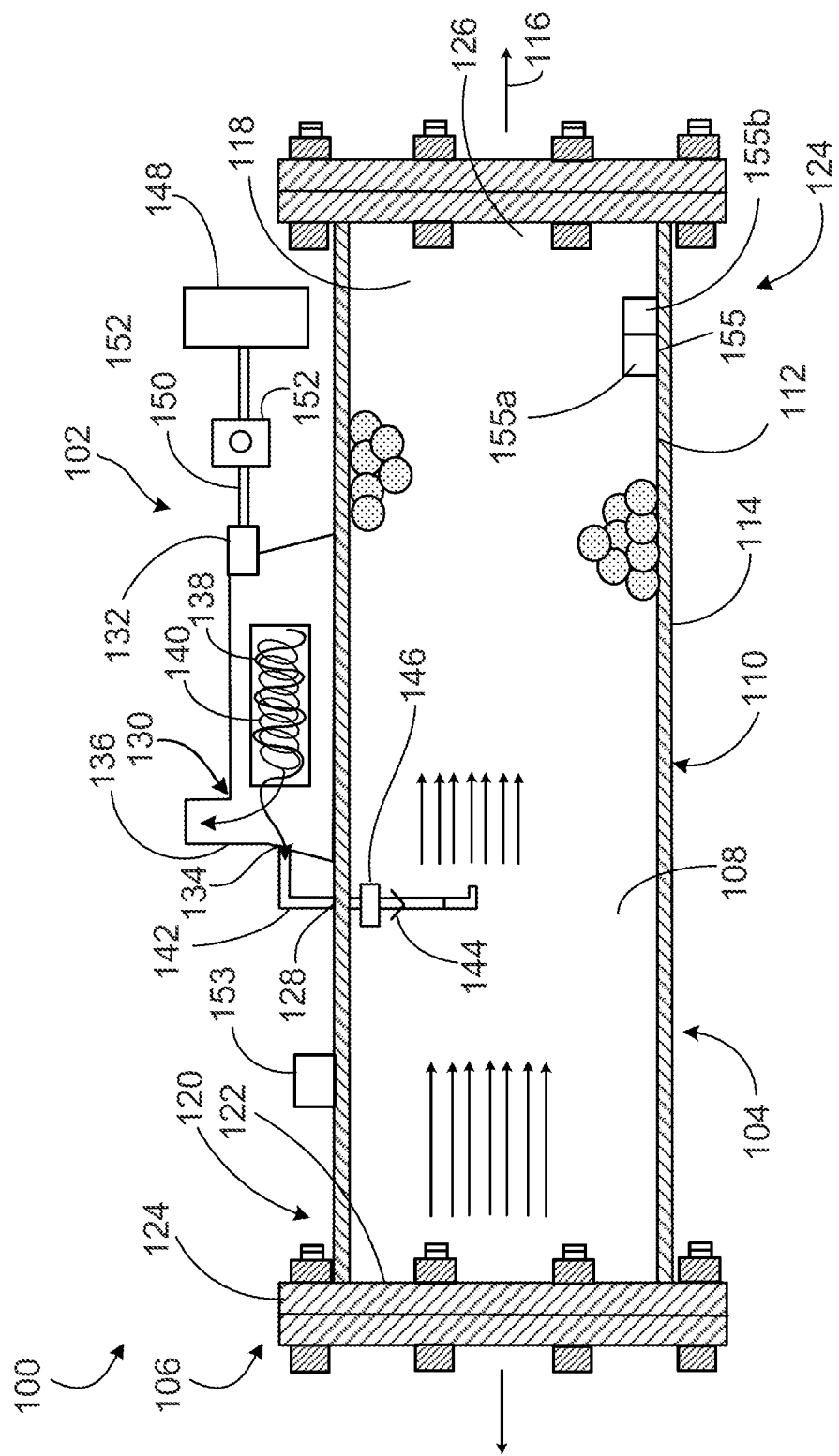
FIG. 1 is a schematic view of a system with a heater assembly mounted on a section of a pipeline.

FIG. 1 is a schematic view of a system 100 with a heater assembly 102 mounted on a (first) section 104 of a pipeline 106. A natural gas fluid 108 can flow in the pipeline 106 and includes natural gas, water and other compounds that are typically produced with natural gas. The system 100 is configured to heat the natural gas fluid 108 flowing in the pipeline 106 to a temperature that prevents the formation of hydrates and/or destabilizes any formed hydrates present in the pipeline 106.

The section 104 of the pipeline 106 includes a wall 110 with an inner surface 112 and an outer surface 114. The inner surface 112 of the wall 110 defines an interior volume 118, in which the natural gas fluid 108 is contained. The wall 110 of the section 104 extends from a first open end 120 defining an inlet 122 to a second open end 124 defining an outlet 126. The inlet 122 and outlet 126 are fluidly connected by the interior volume 118. Connectors 129 are mounted on the first and second open ends 120, 124 to connect the section 104 of the pipeline to other sections of the pipeline, described in detail with reference to FIG. 4. The section 104 of the pipeline 106 is centered on an axis 116 that passes through the first open end 120 and the second open end 124. The natural gas fluid 108 generally flows parallel to the axis 116. The wall 110 of the section 104 of the pipeline 106 further includes an opening 128 that extends from the outer surface 114 to the inner surface 112. The opening 128 has a diameter of about ¼ inch to about 1½ inch. The opening 128 extends in a direction perpendicular to the axis 116, however, some openings extend at an angle relative to the axis 116, e.g. 10°, 20°, 30°, 40°, 50°, 60°, 70°, 80°, 100°, 110°, 120°, 130°, 140°, 150°, 160°, or 170°.

The heater assembly 102 includes a (first) vortex tube 130 mounted on the outer surface 114 of the wall 110 of the section 104 of the pipeline 106. Vortex tubes are include two fluid pathways that separate a gas into a hot gas flow and a cold gas flow. The vortex tube 130 includes a (first) compressed gas inlet 132, a (first) hot gas outlet 134 and a (first) cold gas outlet 136. The vortex tube 130 is configured to receive a compressed gas at the inlet 132 and separate the compressed gas into a hot gas pathway 138 and a cold gas pathway 140.

Hot gas in the hot gas pathway 138 exits the hot gas outlet 134, whereas, cold gas in the cold gas pathway 140 exits the cold gas outlet 136. The hot gas outlet 134 of the vortex tube 130 is fluidly connected to the opening 128 of the pipeline 106 by a fluid tubing 142. The fluid tubing 142 is sealed to the hot gas outlet 134 at one end, and to the opening 128 at the opposite end. The hot gas exiting the hot gas outlet 134 of the vortex tube 130 flows into the interior volume 118 of the section 104 of the pipeline 106 to mix with the natural gas fluid 108 and increases the temperature of the natural gas fluid 108. The fluid tubing 142 has a one-way valve 144, e.g., a check valve or similar valve that prevents fluid in the pipeline 106 from entering the heater assembly 102. The fluid tubing 142 also includes a control valve 146 that controls the flow of hot compressed gas into the interior volume 118 of the section 104 of the pipeline 106. The cold gas exiting the cold gas outlet 136 can be vented to the environment or can be redirected by additional fluid tubing. The cold gas can be used for cooling welding hot spots, and/or to cool a compressor motor.

The heater assembly 102 further includes a compressed gas source 148 fluidly connected to the inlet 132 of the vortex tube 130. The compressed gas source 148 contains a compressed gas, e.g., nitrogen, or methane. The compressed gas source 148 is connected to the inlet 132 of the vortex tube 130 by a compressed fluid line 150. A pump 152 controls the flow of the compressed gas and is arranged on the compressed fluid line 150. The pump 152 further controls the volume of compressed gas that enters the vortex tube 130. In some cases, a control valve, alone or in combination with the pump, controls the flow and/or volume of compressed gas that enters the vortex tube.

The heater assembly includes a processor 153 operable to control the flow of hot gas into the interior volume 118 of the pipeline 106 and/or to control the flow of compressed gas into the vortex tube 130. The processor 153 is electronically connected to the pump 152, the control valve 146, and a sensor arrangement 155. The sensor arrangement 155 includes a temperature sensor 155a and a pressure sensor 155b in the interior volume 118 of the pipeline 106. The processor 153 receives temperature signals containing temperature measurements from the temperature sensor 155a and receives pressure signals from the pressure sensor 155b. The temperature and pressure of the pipeline are indicative of an environment in which hydrates can be formed, maintained, or dissolved. The processor 153 can adjust the flow of compressed gas or hot gas to increase the temperature of the fluid flowing in the pipeline 106. In some cases, the processor or an operator controls an inlet pressure and the volume of the gas entering the inlet of the vortex tube by a valve. The hot gas mixes with the natural gas fluid 108 in the pipeline to raise the temperature of the natural gas fluid in the pipeline to such a degree that hydrates cannot solidify and formed hydrates are destabilized.

The processor can be implemented as a computer system that includes or is connected to a computer-readable medium (for example, a non-transitory computer-readable medium) storing instructions executable by the computer system to perform the operations described here. Alternatively or in addition, the processor can be implemented as electrical circuitry, firmware, hardware or combinations of one or more of them with the computer system The pressure sensor 155b is electronically connected to the processor 153 and transmits signals containing pressure measurements to the processor 153. In some systems, a temperature sensor and/or pressure sensor is mounted on each section of the pipeline. Some systems have more than one sensor per section of pipeline. Some systems have one or more pressure sensors arranged in each section of the pipeline.

In some cases, the heater valve and pump of the system are mechanically controlled (e.g., not controlled by a processor). The valve arranged on the fluid tubing opens at a predetermined pressure to control hot gas into the pipeline and the pump arranged on the compressed gas line continuously flows compressed gas into the inlet of the vortex tubing.

FIG. 2 is a cross sectional view of the section 104 of the pipeline 106 shown in FIG. 1 with the heater assembly 102. The natural gas fluid 108 includes water 154 and natural gas 156 at a high pressure (e.g., 800 pound per square inch (psi) and 2000 psi) and a low temperature (e.g., 0° C. to 20° C.). Under these conditions, the combination of water 154 and natural gas 156 form hydrate particles 158, which can collect or group together to form a hydrate plug. The heater assembly 102 controls the conditions of the interior volume 118 of the section 104 of the pipeline 106 to prevent the formation of hydrate particles 158. The heater assembly can raise the temperature of the natural gas fluid to between 20° C. and 40° C. Some systems alter the conditions of the interior volume to dissolve any existing hydrate particles by raising the temperature of the natural gas fluid to about 20° C. to 60° C.

FIG. 3 is a flow chart of a method 160 to prevent the formation of hydrates using a system having a heater assembly. The method 160 is described with reference to the system 100 illustrated in FIG. 1, however, the method 160 may be used in any other system.

The method includes flowing the natural gas fluid 108 through the first open end 120 of the section 104 of the pipeline 106 and flowing the natural gas fluid through the interior volume 118 of the section 104 of the pipe pipeline in a first direction parallel to the axis 116. The natural gas fluid 108 includes water 154 (FIG. 2) and natural gas 156 (FIG. 2) at a temperature and pressure combination sufficient to form a hydrate or a temperature (e.g., hydrate formation conditions) and pressure combination sufficient to stabilize a formed hydrate (e.g., metastable hydrate conditions). Natural gas in each system is measured to generate a cooling curve that calculates the pressure and temperature ranges at which a hydrate is formed and the pressure and temperature ranges at which a hydrate is stable or unstable. A cooling curve may differ for each system due to the complexity of the natural gas system and the presence of impurities and water fluid. The pressure of the natural gas fluid 108 can be between 800 psi and 2000 psi. The temperature of the natural gas fluid 108 can be between 5° C. and 10° C. (e.g., below 15° C.).

A temperature sensor measures the temperature of the natural gas fluid 108 in the section 104 and transmits the (first) temperature signal containing the measured temperature to the processor 153. The processor 153 determines if the measured temperature is below a predetermined temperature, e.g., below 10° C., indicating that the conditions of the natural gas fluid are sufficient to form hydrates. If the measured temperature is below the predetermined temperature the processor 153 signals to the valve 146 on the fluid tubing 142 or on the compressed fluid line 150 to open and signals to the pump 152 to pump compressed gas (e.g., nitrogen gas) from the compressed gas source 148 to the inlet 132 of the vortex tube 130. In some cases, a pressure sensor arranged in the interior volume of the pipeline also measures and transmits a pressure signal to the processor containing a pressure measurement. The pressure measurement and temperature measurement are analyzed by the processor to determine if the conditions of the natural gas fluid are sufficient to form hydrates.

The compressed gas enters the inlet 132 of the vortex tube 130 and is separated into a hot gas pathway 138 and a cold gas pathway 140. The cold gas in the cold gas pathway 140 exits the cold gas outlet 136 to the environment. The hot gas in the hot gas pathway 138 exits the hot gas outlet 134 into the fluid tubing 142. Hot gas then flows from the hot gas outlet 134 of the vortex tube 130 to the interior volume 118 of the section 104 of the pipeline 106 via the opening 128 in the wall 110 of the section 104 such that a temperature of the natural gas fluid 108 flowing in the interior volume 118 increases. The temperature of the natural gas fluid 108 increases to a temperature between 20° C. and 40° C. so that hydrates cannot form. This temperature increase (or second temperature of the natural gas fluid) is measured by the temperature sensor 155a, and transmitted to the processor 153 as second temperature signals. The opening 128 extends through the wall 110 of the section 104, perpendicular to the first direction. The method can include controlling the valve 146 or pump 152 to adjust the temperate of the natural gas fluid based on the temperature measurements. For example, if the second temperature of the natural gas fluid is high (e.g., above 25° C.), the processor may signal to the pump to stop or decrease the pump speed. If the measured temperature of the natural gas fluid is low or demonstrates a slow rate of change, the processor may signal to the pump to increase the pump speed.

Figure 4:
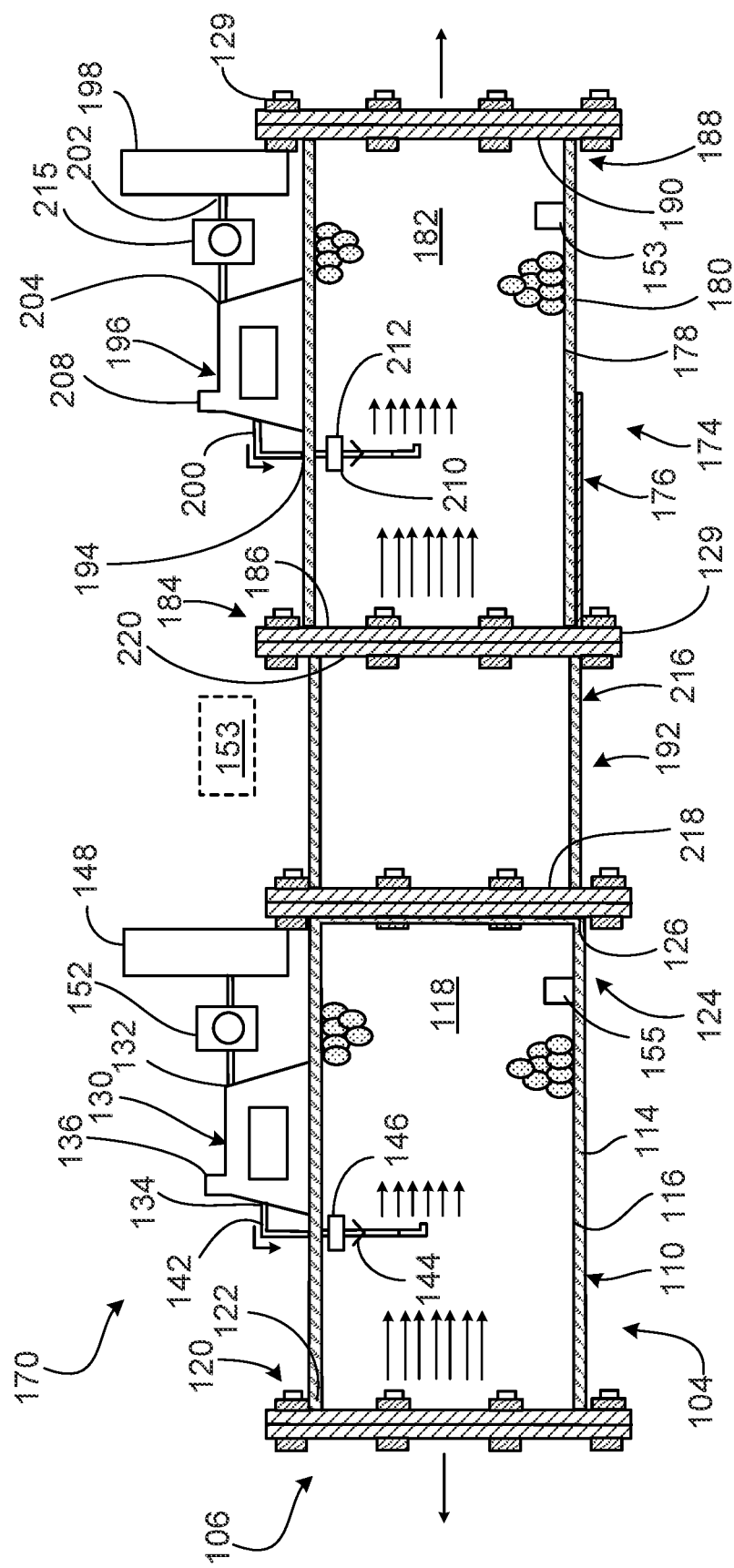
FIG. 4 is a schematic view of a system with a heater assembly having multiple heater assemblies mounted on sections of a pipeline.

FIG. 4 is a schematic view of a system 170 with a heater assembly 172 having multiple vortex tubes mounted on sections of the pipeline 106. The system 170 is substantially similar to the system 100, however, the system 170 includes the first section 104 of the pipeline 106, described with reference to FIG. 1, and a second section 174 of the pipeline 106.

The second section 174 of the pipeline 106 includes a second wall 176 with a second inner surface 178 and a second outer surface 180. The second inner surface 178 of the second wall 176 defines a second interior volume 182, in which the natural gas fluid 108 flows. The second wall 176 of the second section 174 extends from a first open end 184 defining an inlet 186 to a second open end 188 defining an outlet 190. The inlet 186 and outlet 190 are fluidly connected by the second interior volume 182. Connectors 129 are mounted on the first and second open ends 184, 188 to connect the second section 174 of the pipeline 106 to the first section 104 of the pipeline 106 via a third section 192 of the pipeline 106. The second section 174 of the pipeline 106 is centered on the axis 116. The natural gas fluid 108 flows parallel to the axis 116 through the first, second, and third sections 104, 174, 192 of the pipeline 106. The second wall 176 of the second section 174 of the pipeline 106 further includes an opening 194 that extends from the second outer surface 180 to the second inner surface 178. The opening 194 has a diameter of about ¼ inch to about 1½ inch. The opening 194 extends in a direction perpendicular to the axis 116, however, some openings extend at an angle relative to the axis 116, e.g. 10°, 20°, 30°, 40°, 50°, 60°, 70°, 80°, 100°, 110°, 120°, 130°, 140°, 150°, 160°, or 170°.

The heater assembly 172 is substantially similar to the heater assembly 102, however, the heater assembly 172 includes a second vortex tube 196, a second compressed gas source 198, a second fluid tubing 200, and a second compressed fluid line 202. The second vortex tube 196 is mounted on the second outer surface 180 of the second wall 176 of the second section 174 of the pipeline 106. The second vortex tube 196 includes a (second) compressed gas inlet 204, a (second) hot gas outlet 206 and a (second) cold gas outlet 208. The second vortex tube 196 is configured to receive and separate a compressed gas from the compressed gas inlet 204 into a hot gas pathway (not shown) and a cold gas pathway (not shown).

Hot gas in the hot gas pathway exits the hot gas outlet 206, whereas, cold gas in the cold gas pathway exits the cold gas outlet 208. The hot gas outlet 206 of the second vortex tube 196 is fluidly connected to the opening 194 of the pipeline 106 by the second fluid tubing 200. The second fluid tubing 200 is sealed to the hot gas outlet 206 at one end, and to the opening 194 at the opposite end. The hot gas exiting the hot gas outlet 206 of the second vortex tube 196 flows into the second interior volume 182 of the second section 174 of the pipeline 106 to mix with the natural gas fluid 108 and increase the temperature of the natural gas fluid 108. The second fluid tubing 200 has a one way valve 210, e.g. a check valve that prevents fluid in the pipeline 106 from entering the heater assembly 172. The second fluid tubing 200 also includes a control valve 212 that controls the flow of hot compressed gas into the second interior volume 182 of the second section 174 of the pipeline 106. The cold gas exiting the cold gas outlet 208 can be vented to the environment or can be redirected by additional fluid tubing.

The third section 192 includes a wall 216 with a first open end 218 and a second open end 220. The first open end 218 of the third section 192 connects by a connector 129 to the second open end 124 of the first section 104. The second open end 220 of the third section 192 connects, by a connector 129, to the first open end 184 of the second section 174. In this configuration, the first open end 120 of the first section 104 fluidly connects to the second open end 188 of the second section 174 via the third section 192.

The heater assembly 172 further includes the processor 153 and the second compressed gas source 198 fluidly connected to the inlet 204 of the second vortex tube 196. The second compressed gas source 198 contains a compressed gas, e.g., nitrogen or methane. The second compressed gas source 198 is connected to the inlet 204 of the second vortex tube 196 by the second compressed fluid line 202. A pump 214 controls the flow and/or volume of compressed gas that enters the second vortex tube 196. The processor is electronically connected to the valves 146, 212, the pumps 152, 214, and temperature sensors 155a to control the flow of hot gas in the first section 104 and the second section 174. This configuration may reduce the formation of hydrates over a longer portion of a pipeline. In some cases, a control valves arranged on the first and second compressed fluid lines, alone or in combination with the pumps, controls the flow and/or volume of compressed gas that enters the first and second vortex tube.

Some systems have multiple sections, e.g., three, ten, twenty, fifty, seventy, or one hundred sections, each with a vortex tube mounted on the section.

In some systems, the inlet of the second vortex tube is connected to the first compressed gas source, such that the same compressed gas source provides the compressed gas to multiple vortex tubes.

While the first and second sections 104, 174 have been described as being centered on the same axis 116, some sections are centered on different axes. The openings of the walls of each section can be perpendicular to the axis of each section.

A number of embodiments have been described. Nevertheless, it will be understood that various modifications may be made without departing from the spirit and scope. Accordingly, other embodiments are within the scope of the following claims.

What is claimed is:

1. A system to prevent the formation of hydrates in a pipeline; the system comprising:
    a heater assembly comprising:
        a vortex tube mounted on an outer surface of a first section of the pipeline, wherein the vortex tube is configured to separate gas from an inlet into a hot gas pathway and a cold gas pathway; wherein the vortex tube comprises:
        the inlet,
        a cold gas outlet, wherein the cold gas outlet is configured to vent cold gas from the cold gas pathway to the environment, and
        a hot gas outlet, wherein the hot gas outlet of the vortex tube is fluidly connected to an opening defined in the first section of the pipeline, wherein the hot gas outlet is configured to flow hot gas from the vortex tube into an interior volume of the pipeline; and
    a compressed gas source fluidly connected to the inlet of the vortex tube.

2. The system according to claim 1, wherein the heater assembly comprises a compressed fluid line connects the compressed gas source to the inlet of the vortex tube.

3. The system according to claim 2, wherein a valve is mounted on the compressed fluid line, wherein the valve is configured to control a volume of compressed fluid that enters the vortex tube.

4. The system according to claim 3, further comprising:
one or more processors; and
a computer-readable medium storing instructions executable by the one or more processors to perform operations comprising:
receiving signals from a temperature sensor arranged in the pipeline downstream of the opening of the pipeline; and
controlling the valve mounted on the compressed fluid line to increase or decrease an amount of hot air entering the pipeline from the vortex tube.

5. The system according to claim 1, wherein the heater assembly comprises a fluid tubing connects the hot gas outlet of the vortex tube to the opening of the pipeline.

6. The system according to claim 5, wherein a valve is mounted on the fluid tubing, wherein the valve is configured to control a volume of hot gas that enters the pipeline by the opening.

7. The system according to claim 6, further comprising:
one or more processors; and
a computer-readable medium storing instructions executable by the one or more processors to perform operations comprising:
receiving signals from a temperature sensor arranged in the pipeline downstream of the opening of the pipeline; and
controlling the valve mounted on the fluid tubing to increase or decrease an amount of hot gas entering the pipeline from the vortex tube.

8. The system according to claim 1, wherein the hot gas pathway of the vortex tube extends from the inlet of the vortex tube to the hot gas outlet of the vortex tube.

9. The system according to claim 1, wherein the cold gas pathway of the vortex tube extends from the inlet of the vortex tube to the cold gas outlet of the vortex tube.

10. The system according to claim 1, further comprising at least one temperature sensor arranged in the interior volume of the first section of the pipeline.

11. The system according to claim 1, further comprising at least one pressure sensor arranged in the interior volume of the first section of the pipeline.

12. The system according to claim 1, wherein the compressed gas source contains a compressed nitrogen gas.

13. The system according to claim 1, wherein the heater assembly is mounted to an exterior surface of the pipeline.

14. The system according to claim 1, wherein the pipeline is configured to flow a natural gas fluid, wherein the compressed fluid source is configured to contain a compressed gas, wherein the compressed gas and the natural gas fluid are different.

15. A system to prevent the formation of hydrates in a pipeline comprises:
a first heater assembly comprising:
a first vortex tube mounted on a first section of the pipeline, the first vortex tube comprising:
a first inlet,
a first cold gas outlet, wherein the first cold gas outlet is configured to vent cold gas generated by the first vortex tube to the environment, and
a first hot gas outlet, wherein the first hot gas outlet of the first vortex tube is fluidly connected to a first opening of the first section of the pipeline; and
a second heater assembly comprising:
a second vortex tube mounted on a second section of the pipeline in fluid commination with the first section, the second vortex tube comprising:
a second inlet,
a second cold gas outlet, and
a second hot gas outlet, wherein the second hot gas outlet of the second vortex tube is fluidly connected to a second opening of the second section of the pipeline.

16. The system according to claim 15, further comprising a first compressed gas source fluidly connected to the first inlet of the first vortex tube.

17. The system according to claim 16, wherein the first compressed gas source is fluidly connected to the second inlet of the second vortex tube.

18. The system according to claim 16, further comprising a second compressed gas source fluidly connected to the second inlet of the second vortex tube.

19. The system according to claim 15, further comprising at least one temperature sensor arranged in an interior volume of the first section or the second section of the pipeline.

20. The system according to claim 19, wherein the at least one temperature sensor is mounted on an inner surface of the first section of the pipeline, the inner surface of the second section of the pipeline, or both the inner surface of the first section and an inner surface of the second section.

21. The system according to claim 15, further comprising a heater assembly comprising a third vortex tube mounted on an outer surface of a third section of the pipeline.

22. The system according to claim 15, wherein the pipeline is configured to flow a natural gas fluid, wherein the compressed fluid source is configured to contain a compressed gas, wherein the compressed gas and the natural gas fluid are different.

23. The system according to claim 15, wherein the first heater and the second heater are mounted to an exterior surface of the pipeline.

24. The system according to claim 18, wherein at least one of the first compressed gas source and the second compressed gas source contain a compressed nitrogen gas.

25. The system according to claim 18, wherein at least one of the first compressed gas source and the second compressed gas source are mounted to an exterior surface of the pipeline.

* * * * *